United States Patent [19]
Gladstone

[11] 3,761,583
[45] Sept. 25, 1973

[54] CUPROUS THIOCYANATE DENTIFRICE COMPOSITION

[75] Inventor: Shaul Gladstone, Wilmington, Del.

[73] Assignee: Witco Chemical Corporation, New York, N.Y.

[22] Filed: Mar. 8, 1971

[21] Appl. No.: 122,209

[52] U.S. Cl. ................................. 424/48, 424/54
[51] Int. Cl. ............................................ A61k 7/16
[58] Field of Search ...................... 424/54, 129, 48

Primary Examiner—Richard L. Huff
Attorney—Mortenson & Weigel

[57] ABSTRACT

A plaque inhibiting and reducing mixture is formed of cuprous thiocyanate and any of the conventional dentifrices including powder, paste, chewing gums, permanent or temporary coatings and liquids. So utilized, the active ingredient cuprous thiocyanate has the ability to inhibit and reduce plaque and hence calculus and thereby affords a reduction in the possibility of periodontal diseases and dental caries.

10 Claims, No Drawings

CUPROUS THIOCYANATE DENTIFRICE COMPOSITION

BACKGROUND OF THE INVENTION

This invention relates to a plaque inhibiting and reducing composition having as its active ingredient cuprous thiocyanate.

While common gum or periodontal diseases are the result of relatively complex biological phenomena, it is generally conceded that such diseases are caused by an excessive accumulation of a material called plaque on the surface of the teeth, gums and at the juncture of teeth and gums. If such condition is allowed to continue unabated, the gums eventually tend to recede far enough to expose the bone in which the teeth are embedded thereby causing resulting infection, loss of teeth and other dental problems. The plaque, itself, is a film on the oral surfaces that is made up of mucin and colloidal material secreted by the salivary glands. It also tends to contain bacteria and it is believed to be one of the factors in the development of dental caries.

Since the formation of plaque and the plaque tending to harden into calculus is occurring in the mouth as a result of the secretions of the salivary glands 24 hours a day, it follows that only continuous brushing and gum massage can completely prevent its formation. Since this approach is completely impractical, it is necessary and/or desirable to find some other more appropriate method of treatment which permits the removal of existing plaque and calculus and reduces the ability of plaque to adhere to the teeth and gums. Any substance which is used for such purpose must be non-toxic to the user and cannot damage the teeth themselves, the mouth tissues or only dental repair material that is used in connection with the mouth. Finally, the substance should be a relatively stable substance capable of being incorporated in various dentifrices such as the toothpastes, powders, the mouthwashes, chewing gums and the materials used in tooth coatings without decomposition over relatively extended periods of time. As used herein, the term "dentifrices" will be taken to include all of the above named materials.

It is, therefore, an object of this invention to reduce periodontal diseases and dental caries.

Another object of this invention is to provide a mixture capable of inhibiting the formation of plaque on the teeth and of preventing the small quantity of plaque that does form from hardening into calculus.

BRIEF DESCRIPTION OF THE INVENTION

In accordance with a preferred embodiment of this invention, a plaque inhibiting and reducing mixture is formed utilizing cuprous thiocyanate as the active ingredient together with the well-known dentifrice carriers such as mouthwashes, toothpaste, tooth powders, chewing gums and tooth coatings and the like.

DESCRIPTION OF THE PREFERRED EMBODIMENT

Surprisingly, it has been discovered that a plaque inhibiting and reducing composition utilizing cuprous thiocyanate in combination with any of the well known dentifrices has an amazing property of being able to inhibit and reduce the formation of plaque upon the teeth of the user and to keep the small quantity of plaque that does form in a soft, pliable, easily removable form. This has of course the secondary and desirable objective of reducing periodontal diseases and tooth decay without being toxic or otherwise harmful to the user, to the user's teeth and dental materials or to the human body.

The use of cuprous thiocyanate in this mixture has many advantages. Among these are that cuprous thiocyanate is extremely insoluble in water, acids or alkalies. Hence, any toxic effects which could be exhibited by either the copper portion of the molecule or the thiocyanate portion of the molecule when reacting with other substances are not exhibited by the combination of cuprous thiocyanate. Hence, many of the usual limitations on the use of copper in connection with oral intake of food are not entirely applicable to this composition. In addition, the cuprous thiocyanate is a relatively stable compound which shows essentially little or no decomposition after five years or more. This is particularly desirable when it is used in dentifrices which in some cases may be stored for extended periods of time. In addition, cuprous thiocyanate has no effect on the usual materials used in general care or reconstruction such as tooth fillings, bridges, etc. One of the most desirable qualities of cuprous thiocyanate is that it tends to reduce significantly the adherence of plaque to the teeth and gums. Tests have demonstrated that up to 95 percent reduction in plaque can be achieved in usage in a period as short as one week.

In tests of the usage of the cuprous thiocyanate after 6 months little or no hard calculus formation on the teeth could be found. In fact, any plaque still adhering to the teeth is more easily removed with water or gentle brushing after use of cuprous thiocyanate, and in fact the capacity of plaque to harden into tartar or calculus is significantly reduced with the result that it is more easily removed by the dentist or dental technician during routine cleaning of the teeth.

The following examples of a dentifrice composition utilizing cuprous thiocyanate in accordance with the advanages illustrate the many novel compositions that may be obtained. In the experiments below the effectiveness of the dentifrice prepared is followed through the use of dye tablets commonly known as "disclosing tablets." After the use of the dentifrice containing the cuprous thiocyanate such a tablet, normally containing erhtyrosine as the dye, is chewed by the person who applied the test dentifrice. The dye deeply colors any plaque present thus making the presence of plaque easy to see and to measure. The dye, of course, is readily removed by ordinary toothpaste materials.

EXAMPLE 1

A dry mixture is prepared by blending together 38.5 parts of dicalcium phosphate, 10.0 parts of cuprous thiocyanate, 2.0 parts of sodium lauryl sulfate, 0.8 part of sodium carboxymethyl cellulose, 0.5 part of trimagnesium phosphate, 0.3 part of magnesium aluminum silicate, 0.3 part of methyl p-hydroxybenzoate and 0.2 part of sodium saccharin. The dry blend is then added to a solution of 19.3 parts of sorbitol in 27.1 parts of water, and the materials are well mixed after which 1 part of peppermint flavor oil is added followed by thorough mixing. The resultant toothpaste has all the appearances and activities of conventional toothpastes, but, due to the presence of the cuprous thiocyanate (10 percent based on the total weight), it, upon use, extensively reduces plaque formation, repelling bacteria and also preventing tartar formation.

EXAMPLE II

To prepare a tooth powder dentifrice the following materials are placed in a vessel: 80 parts of dicalcium phosphate dihydrate, 10 parts of cuprous thiocyanate, 5 parts of sodium N-lauroyl sarcosinate, 3 parts of disodium acid phrophosphate, 1.9 parts of peppermint flavor oil and 0.1 parts of saccharin. The mixture is dry blended using conventional blending technique and apparatus. The dentifrice effectively reduces and inhibits plaque formation.

EXAMPLE III

The blending procedure of Example II is repeated except that equal parts of dicalcium phosphate dihydrate (50 parts) and curpous thiocyanate (50 parts) are the only materials used. Again, very effective plaque inhibition is attained with this tooth powder.

In another experiment cuprous thiocyanate entirely by itself in fine powder form is used as the tooth powder. The inhibition desired is attained. Flavoring materials can be added without adverse effect on the action of the cuprous thio-cyanate. In one test the user applied powdered cuprous thiocyanate with a moistened toothbrush to only half the mouth after meals over a period of six months and to the remainder of the mouth he applied only ordinary tooth powder. After 1 week the plaque remaining on the portion treated with cuprous thiocyanate was reduced 95 percent and after 6 months no hard calculus had formed whereas considerable portions were found on the untreated teeth. Similar results are attained when powdered cuprous thiocyanate is used along with conventional, commercially available toothpastes and mouthwashes. With a mouthwash the reduction in plaque after one week was 80 percent. While less than that attained using a brush, the wash technique is highly indicative of the high effectiveness of cuprous thiocyanate in reducing or inhibiting plaque and hence in reducing periodontal diseases and dental caries.

EXAMPLE IV

A mouthwash dentifrice is prepared by adding to a water/ethanol (83.8 parts/14.8 parts) solution, 0.1 part of cetyl dimethyl benzyl ammonium chloride, 0.5 part of oil of lemon, 0.6 part of sorbitan monostearate polyoxyethylene condensate (60 mols of ethylene oxide per mol), 0.1 part of saccharin and 0.1 part of cuprous thiocyanate. Upon tumbling the container or stirring the ingredients thoroughly, a homogenized, liquid results. Its effectiveness in inhibiting plaque is comparable in all respects to the other types of dentrifices dentifrices above.

EXAMPLE V

In order to test the effectiveness of cuprous thiocyanate in a non-powder, non-liquid form, a chewing gum was prepared containing it. A standard commercial gum base was used, being known as Clark Brothers C-100. To 20 parts of it was added 60 parts of sugar, 15 parts of corn syrup (45° B.) and 5 parts of cuprous thiocyanate. Flavor can be added, of course, to impart any of the various tastes. The material after blending is shaped into conventional gum sticks. These inhibit plaque formation to substantially the same extent as the other forms of the dentifrices of this invention.

EXAMPLE VI

A 5 percent thiocyanate was suspended in nitrocellulose lacquer and applied as a thin coating to the teeth. This coating after observation revealed a significant reduction in plaque. Other resins than nitrocellulose can also be employed. For example, resins containing acrylates, methacrylates, and phenolics may also be employed, as carriers for the cuprous thiocyanate. Coatings produced in this example are semi-permanent, since they are gradually worn away by brushing, chewing, tooth grinding and the like. They are, however, readily applied and can be easily replaced from time to time depending upon the diet, habit and needs of the individual.

The fundamental requirement for the carrier for the cuprous thiocyanate is that it be non-toxic to the mouth tissues or teeth. The particular advantage to the cuprous thiocyanate in dentifrice compositions is that it has a tendency to adhere very strongly to the mouth surfaces without being rinsed away. This is in extreme contrast to some of the alkali sulfocyanides that have been used in the past as dentifrices. Such alkali sulfocyanides are extremely soluble in water and hence, are immediately washed away and have little time in which to perform the plaque removing and loosening functions and because of their solubility do present a possible problem of toxicity.

Cuprous thiocyanate is surprisingly effective in inhibiting plaque and reducing periodontal diseases and dental caries. Other thiocyanates have been tried with virtually negative results. Thus, sodium, potassium, iron and ammonium thiocyanates were found to have no residual power after about thirty minutes of salivation. While there are other water insoluble thiocyanates, a number of these are toxic to human beings as, for example, lead and mercury thiocyanates. Also, other water insoluble thiocyanates are substantially more water soluble (0.5 to 0.7 percent) than cuprous thiocyanate which is soluble only to the extent of 0.0005 percent. Further, cuprous thiocyanate has a great tendency to be absorbed on the surface of the teeth and gums and to resist being rinsed away readily by saliva or external rinses. Other copper compounds having plaque inhibiting effects are unknown to the applicant. Cuprous thiocyanate is, therefore, unique, having low toxicity, stubborn adherence to teeth and gums, low solubility and high effectiveness and efficiency in inhibiting or reducing plaque formation, besides being a relatively inexpensive and commercially available compound.

As can be seen above, it can be used in dentifrices in amounts varying from about 0.01 percent to about 100 percent. Below about 0.01 percent the rate of absorption on the surface of teeth and gums is too slow to compete effectively with normal attrition from eating and chewing. Above that amount an effective build-up occurs, but below 1 percent the build-up is slow and beneficial effects are delayed. Thus, the preferred amount at the lower range is 1 percent. In high amounts, for example, 100 percent and even about 10 percent, most of the cuprous thiocyanate is wasted. Therefore, it is preferred to use amounts of about 1 percent to about 10 percent in the dentifrices of this invention.

There has thus been described an extremely novel composition having surprising abilities to reduce and inhibit the formation of plaque which is a factor in the cause of periodontal diseases. This composition includes the use of cuprous thiocyanate having the many advantages set forth herein.

It is obvious that many embodiments may be made of this inventive concept and that many modifications may be made in the embodiments hereinbefore described. Therefore, it is to be understood that all descriptive material herein is to be interpreted merely as illustrative, exemplary, and not in a limited sense. It is intended that various modifications which might readily suggest themselves to those skilled in the art be covered by the following claims, as far as the prior art permits.

WHAT IS CLAIMED IS:

1. A dentifrice comprising cuprous thiocyanate present in amounts of about 1 percent to about 10 percent by weight.
2. A dentifrice in accordance with claim 1 in which the cuprous thiocyanate is in powder form.
3. A dentifrice in accordance with claim 1 which is in paste form.
4. A dentifrice in accordance with claim 1 which is in liquid form.
5. A dentifrice in accordance with claim 1 which is in gum form.
6. A process of inhibiting or reducing the formation of plaque on teeth which comprises applying cuprous thiocyanate to the teeth using a dentifrice containing about 1 percent to about 10 percent by weight of cuprous thiocyanate.
7. A process in accordance with claim 6 in which the cuprous thiocyanate is applied as a component in a coating forming composition whereby a semi-permanent coating is formed on the teeth.
8. A process in accordance with claim 6 in which the cuprous thiocyanate is applied in powdered form.
9. A process in accordance with claim 6 in which the cuprous thiocyanate is applied in paste form.
10. A process in accordance with claim 6 in which the cuprous thiocyanate is applied in liquid form.

* * * * *